United States Patent
Kataoka et al.

(10) Patent No.: US 9,294,826 B2
(45) Date of Patent: Mar. 22, 2016

(54) WAVELENGTH SELECTION SWITCH SYSTEM AND METHOD FOR CONTROLLING WAVELENGTH SELECTION SWITCH

(71) Applicants: NIPPON TELEGRAPH AND TELEPHONE CORPORATION, Tokyo (JP); NTT Electronics Corporation, Yokohama-shi, Kanagawa (JP)

(72) Inventors: Tomoyoshi Kataoka, Yokosuka (JP); Mitsunori Fukutoku, Yokosuka (JP); Etsu Hashimoto, Atsugi (JP); Akio Sahara, Yokohama (JP); Norio Sato, Yokohama (JP); Yosuke Takeuchi, Yokosuka (JP)

(73) Assignees: Nippon Telegraph and Telephone Corporation, Tokyo (JP); NTT Electronics Corporation, Yokohama-shi (JP)

( * ) Notice: Subject to any disclaimer, the term of this patent is extended or adjusted under 35 U.S.C. 154(b) by 0 days.

(21) Appl. No.: 14/376,786

(22) PCT Filed: Feb. 5, 2013

(86) PCT No.: PCT/JP2013/052562
§ 371 (c)(1),
(2) Date: Aug. 5, 2014

(87) PCT Pub. No.: WO2013/118700
PCT Pub. Date: Aug. 15, 2013

(65) Prior Publication Data
US 2015/0030327 A1    Jan. 29, 2015

(30) Foreign Application Priority Data
Feb. 10, 2012    (JP) ................................. 2012-027248

(51) Int. Cl.
*H04J 14/02* (2006.01)
*H04Q 11/00* (2006.01)
*G02B 26/08* (2006.01)

(52) U.S. Cl.
CPC ........ *H04Q 11/0005* (2013.01); *G02B 26/0816* (2013.01); *H04J 14/0212* (2013.01); *H04Q 2011/0037* (2013.01)

(58) Field of Classification Search
CPC .................. H04Q 11/0005; H04Q 2011/0037; H04J 14/0212; G02B 26/0816
See application file for complete search history.

(56) References Cited

U.S. PATENT DOCUMENTS

2012/0002963 A1    1/2012    Iwasawa et al.
2014/0105601 A1*   4/2014    Ooki ............................... 398/48

FOREIGN PATENT DOCUMENTS

| CN | 101222277 A | 7/2008 |
| JP | H07-152630 A | 6/1995 |

(Continued)

OTHER PUBLICATIONS

International Search Report for PCT/JP2013/052562, ISA/JP, mailed Mar. 12, 2013 (4 pages).

(Continued)

*Primary Examiner* — Leslie Pascal
(74) *Attorney, Agent, or Firm* — Harness, Dickey & Pierce, P.L.C.

(57) ABSTRACT

A wavelength selection switch system includes a wavelength selection switch including an input port and an output port, a nonvolatile memory in which configuration information for controlling an operation of the wavelength selection switch is stored, a high-speed memory in which reading and writing can be performed at a higher speed than in the nonvolatile memory and that stores a copy of the configuration information stored in the nonvolatile memory, and a control unit that controls an operation of the wavelength selection switch based on the configuration information read from the high-speed memory, wherein the control unit periodically reads the configuration information stored in the nonvolatile memory and writes a copy of the read configuration information to the high-speed memory.

8 Claims, 6 Drawing Sheets

(56) References Cited

FOREIGN PATENT DOCUMENTS

| | | |
|---|---|---|
| JP | 2003-131895 A | 5/2003 |
| JP | 2006-086770 A | 3/2006 |
| JP | 2009-036886 A | 2/2009 |
| JP | 2011-259132 A | 12/2011 |
| JP | 2012-008562 A | 1/2012 |
| WO | WO-2009/122516 A1 | 10/2009 |

OTHER PUBLICATIONS

Notice of Allowance for Japanese Patent Application 2012-027248, mailed May 28, 2013 (6 pages).

Office Action, Chinese Patent Application No. 201380008245.2, Dec. 31, 2015.

* cited by examiner

WAVELENGTH SELECTION SWITCH SYSTEM AND METHOD FOR CONTROLLING WAVELENGTH SELECTION SWITCH

CROSS-REFERENCE TO RELATED APPLICATION

This application is a 371 U.S. National Stage of International Application No. PCT/JP2013/052562, filed on Feb. 5, 2013, which claims priority to Japanese Patent Application No. 2012-027248, filed on Feb. 10, 2012. The entire disclosures of the above applications are incorporated herein by reference.

TECHNICAL FIELD

The present invention relates to a wavelength selection switch system including a wavelength selection switch used in an optical fiber communication system and its neighboring circuits, such as a control circuit, and a method of controlling a wavelength selection switch.

BACKGROUND ART

Figure 4:
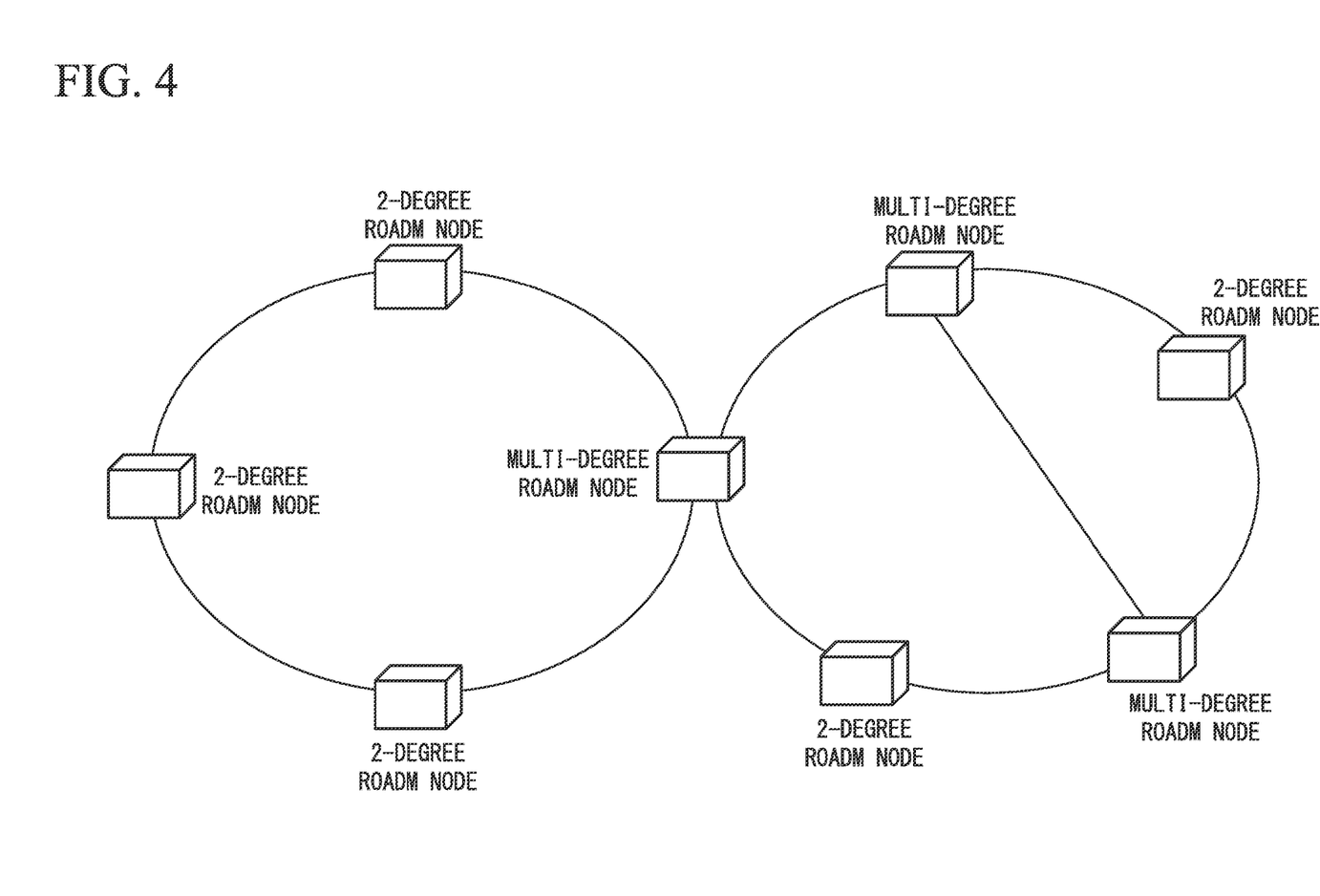
FIG. 4 is a diagram illustrating a configuration of a photonic network.

A photonic network including a plurality of optical nodes and optical fibers that connect the optical nodes is conventionally known. FIG. 4 is a diagram illustrating a configuration of a photonic network. When a client signal is transferred through the photonic network, an optical node transmitting a signal converts the client signal to an optical signal, and transfers the converted optical signal to an optical node receiving the optical signal from the transmitting optical node, and the receiving optical node converts the optical signal to the client signal. A path from the transmitting node to the receiving node through which the optical signal passes is referred to as an optical bus.

In the photonic network illustrated in FIG. 4, an ROADM (Reconfigurable Optical Add/Drop Multiplexer) node is used for the optical node. The ROADM node is a node capable of performing branching and insertion of the optical signal in units of wavelengths from a wavelength multiplexing (WDM: Wavelength Division Multiplexing) signal transferred from an adjacent ROADM node, and transferring the WDM signal to the adjacent ROADM node. A wavelength selection switch (e.g., see Patent Document 1 has recently been used for the ROADM node.

Figure 5:
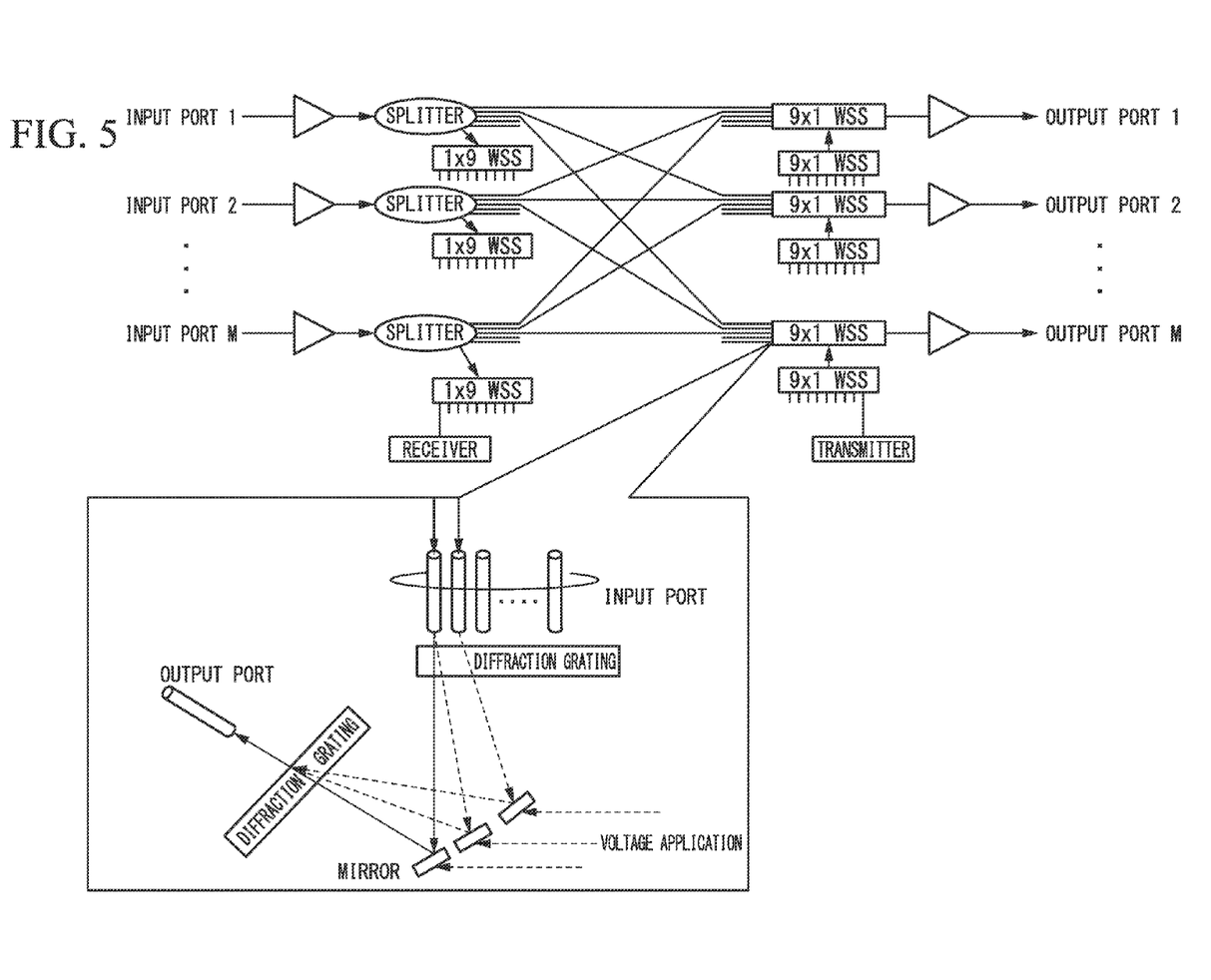
FIG. 5 is a diagram illustrating a configuration of an ROADM node.

A wavelength selection switch that has been put to practical use, for example, includes nine input ports and one output port, and an interface that can set an optical signal output from the output port to any wavelength from any input port. Further, the wavelength selection switch has a function of setting an optical attenuation factor for each wavelength in order to equalize levels of the optical signals from the optical output ports. FIG. 5 is a diagram illustrating a configuration of an ROADM node including a wavelength selection switch. In FIG. 5, the ROADM node includes a wavelength selection switch (WSS) that switches a path of an optical signal, an optical amplifier, a transmitter that converts a client signal into an optical signal and transmits the optical signal, a receiver that receives the optical signal and converts the optical signal to a client signal, and an optical coupler.

In an example, the wavelength selection switch includes a wavelength separation element such as a diffraction grating that separates a path of a wavelength of a WDM signal from each port, and a number of movable mirrors that change the path of each wavelength. Movement of the mirror is realized through application of a voltage.

In this configuration, the wavelength selection switch needs to stably realize switching of an optical signal path in a steady state and attenuation factor adjustment for reduction of a level deviation between wavelengths at a wide range of environmental temperatures. Therefore, a control system having, for example, an external interface function for receiving control information of a relatively complicated control circuit having a temperature compensation function or the like and a wavelength selection switch, and a monitoring function of checking normality of an operation thereof is often built in the wavelength selection switch.

Figure 6:
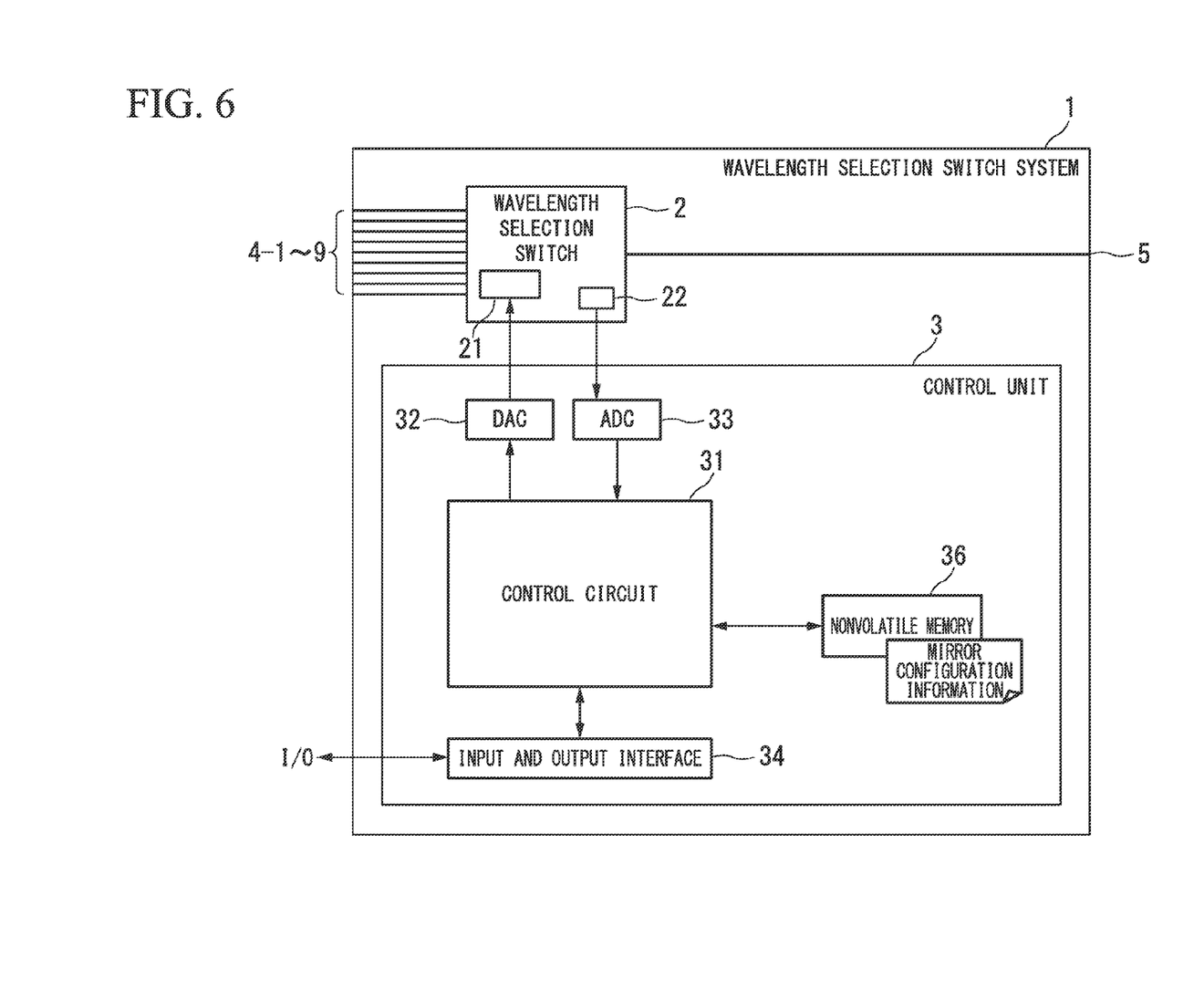
FIG. 6 is a block diagram illustrating a configuration of a wavelength selection switch system according to prior art.

FIG. 6 is a block diagram illustrating a configuration of a wavelength selection switch system. In the wavelength selection switch system 1 illustrated in FIG. 6, an interface with the outside is a digital interface, and a wavelength selection switch system 1 includes mainly a digital circuit. Since driving of a minor 21 in a wavelength selection switch 2 is performed through voltage control, a digital-analog conversion circuit (DAC) 32 is connected to the minor 21 and an analog-digital conversion circuit (ADC) 33 is connected to a sensor part such as a temperature sensor 22 for temperature compensation, but all parts other than these are configured as digital circuits. In the control unit 3 in the wavelength selection switch system 1, a control circuit 31 including, for example, an FPGA (Field-Programmable Gate Array) provides instructions to calculate a driving voltage of the minor 21 based on configuration information of the minor 21 held in a nonvolatile memory 36 and a temperature of the wavelength selection switch from the temperature sensor 22 and to output the voltage to the DAC 32 when a supply voltage is supplied.

For example, in a structure in which a mirror 21 for 100 wavelengths is included and control is performed with three electrodes per mirror, a DAC (or a plurality of DAC groups) including 300 (100×3) output ports is used. In a steady state, processing operations (1) to (3) are repeated in which the control circuit 31 (1) reads mirror configuration information in the nonvolatile memory 36, (2) calculates a temperature compensation value using temperature information from the temperature sensor 22, and (3) instructs the DAC 32 to set a voltage. Further, the control circuit 31 performs rewriting of the nonvolatile memory 36 upon receiving a switch configuration instruction from an I/O port via an input and output interface 34, and controls an operation of the minor 21 based on rewritten mirror configuration information after the rewriting.

Documents of the Prior Art

Patent Document

[Patent Document 1] Japanese Unexamined Patent Application, First Publication No. 2006-86770

DISCLOSURE OF INVENTION

Problems to be Solved by the Invention

Incidentally, in the communication system, it is very important to minimize malfunctions. However, in the wavelength selection switch system 1 as described above, a large-scale circuit is necessary, and it is necessary to adopt a structure which increases reliability. For example, configuration information for driving the minor 21 through an I/O port is input to the input and output interface 34, but this information is held in the nonvolatile memory 36. It is necessary to read this configuration information at a high speed in order to frequently perform driving of the mirror 21.

However, when a high-speed memory (a memory such as a volatile memory faster than a nonvolatile memory in reading and writing operations) such as an SRAM (Static Random Access Memory) from which mirror configuration information can be read at a high speed is used in place of the nonvolatile memory 36, a soft error may be caused due to an influence of cosmic rays, and there is a problem in that a reliability degradation probability increases as a memory scale increases. Further, there is a problem in that the control circuit 31 may potentially malfunction and may be likely to stop in operation since the control circuit itself is complicated. When these problems occur, it is necessary to investigate and isolate the problems to prevent the problems from recurring. However, when the communication system malfunctions, it may often be difficult to isolate a cause of the malfunction since recovery of functions of the system is preferential.

The present invention has been made in view of such circumstances, and an object of the present invention is to provide a wavelength selection switch system and a method for controlling a wavelength selection switch which are capable of improving reliability of reading of configuration information.

Means for Solving the Problem

The present invention is characterized by including: a wavelength selection switch including an input port and an output port; a nonvolatile memory in which configuration information for controlling an operation of the wavelength selection switch is stored; a high-speed memory in which reading and writing is able to be performed at a higher speed than in the nonvolatile memory, and that stores a copy of the configuration information stored in the nonvolatile memory; and a control means that controls an operation of the wavelength selection switch based on the configuration information read from the high-speed memory, wherein the control means periodically reads the configuration information stored in the nonvolatile memory and writes a copy of the read configuration information to the high-speed memory.

The present invention is characterized by further including: a normality confirmation means that confirms normality of data transferred between the control means and the nonvolatile memory and between the control means and the high-speed memory; a malfunction history writing means that writes malfunction history information to the nonvolatile memory when the normality is not able to be confirmed by the normality confirmation means; and a malfunction notification means which notifies the outside of information indicating occurrence of a malfunction when the normality is not able to be confirmed.

The present invention is characterized in that the nonvolatile memory is a flash memory, and writing of the malfunction history information is performed by setting a bit of a predetermined address in the flash memory corresponding to a malfunction detection point to be 1 in advance, and setting the bit of the predetermined address to be 0 when the malfunction occurs.

The present invention is characterized in that the control means includes a first control circuit and a second control circuit, and when circuit information of one of the control circuits is rebuilt, the other control circuit controls the operation of the wavelength selection switch and rebuilds the circuit information of the control circuit to be rebuilt.

The present invention is characterized by a method for controlling a wavelength selection switch system including: a wavelength selection switch including an input port and an output port; a nonvolatile memory in which configuration information for controlling an operation of the wavelength selection switch is stored; a high-speed memory in which reading and writing can be performed at a higher speed than in the nonvolatile memory, and that stores a copy of the configuration information stored in the nonvolatile memory; and a control means that controls an operation of the wavelength selection switch based on the configuration information read from the high-speed memory, wherein the method includes a step in which the control means periodically reads the configuration information stored in the nonvolatile memory and writes a copy of the read configuration information to the high-speed memory.

The present invention is characterized by further including: a normality confirmation step for confirming normality of data transferred between the control means and the nonvolatile memory and between the control means and the high-speed memory; a malfunction history writing step for writing malfunction history information to the nonvolatile memory when the normality cannot be confirmed in the normality confirmation step; and a malfunction notification step for notifying the outside of information indicating occurrence of a malfunction when the normality cannot to be confirmed.

The present invention is characterized in that the nonvolatile memory is a flash memory, and writing of the malfunction history information is performed by causing a bit of a predetermined address in the flash memory corresponding to a malfunction detection point to be 1 in advance, and causing the bit of the predetermined address to be 0 when the malfunction occurs.

The present invention is characterized in that the control means includes a first control circuit and a second control circuit, and the method includes a step in which, when circuit information of one of control circuits is rebuilt, the other control circuit controls the operation of the wavelength selection switch and rebuilds the circuit information of the control circuit to be rebuilt.

Effects of the Invention

According to the present invention, since the high-speed memory in which reading and writing can be performed at a higher speed than a nonvolatile memory and that stores the copy of the configuration information stored in the nonvolatile memory is included, the configuration information stored in the nonvolatile memory is periodically read, the copy of the read configuration information is written to the high-speed memory, and the configuration information is read at a high speed from the high-speed memory to control the operation of the wavelength selection switch, an effect that reliability is improved in comparison with prior art can be achieved.

In addition, even when a malfunction occurs, a cause can be isolated and the cause of the malfunction is easily investigated since the malfunction history information has been stored.

BRIEF DESCRIPTION OF INVENTION

EMBODIMENTS FOR CARRYING OUT THE INVENTION

First Embodiment

Figure 1:
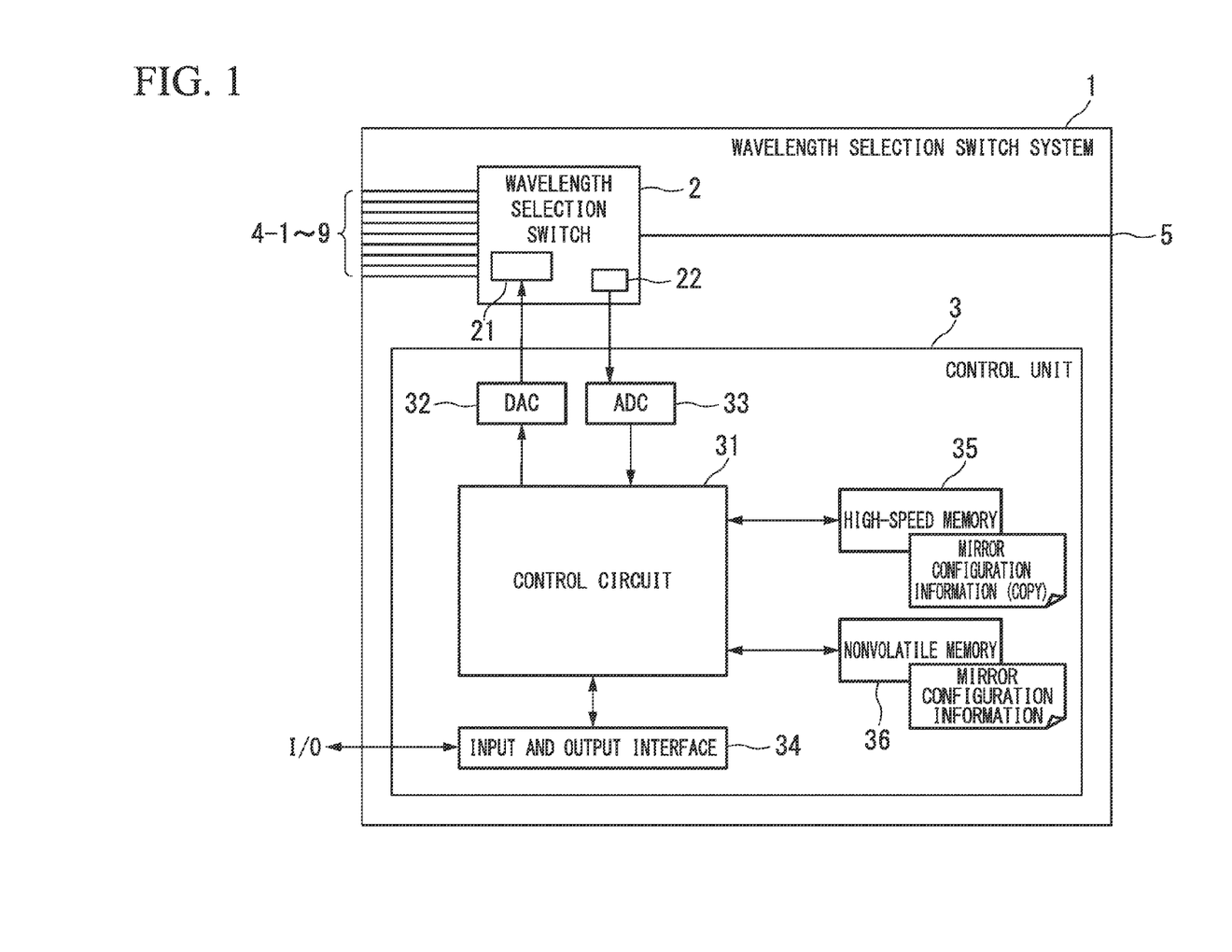
FIG. 1 is a block diagram illustrating a configuration of a first embodiment of the present invention.

Hereinafter, a wavelength selection switch system according to a first embodiment of the present invention will be described with reference to the drawings. FIG. 1 is a block diagram illustrating a configuration of the embodiment. In FIG. 1, the same portions as those in a conventional system illustrated in FIG. 6 are denoted with the same reference signs and description thereof is omitted. The system illustrated in FIG. 1 differs from the conventional system in that a high-speed memory 35 is newly included. The high-speed memory is, for example, a volatile memory such as an SRAM, and is a memory faster than a nonvolatile memory 36 in reading and writing operations. When the high-speed memory 35 is included, reading of the mirror configuration information in a nonvolatile memory in prior art is changed to reading of the mirror configuration information in the high-speed memory. Thus, it is possible to control the minor 21 at a high speed.

Further, a phenomenon called a soft error in which bit inversion occurs due to an influence of cosmic rays (e.g., neutron lines) when the high-speed memory 35 such as an SRAM is steadily used is known. However, in the system illustrated in FIG. 1, it is possible to reduce the influence of the soft error by the control circuit 31 periodically reading the mirror configuration information from the nonvolatile memory 36 such as a flash memory in which the soft error is negligible, and rewriting (copying) the mirror configuration information to the high-speed memory 35.

A rewriting interval, for example, is equal to or more than a reading interval of the mirror configuration information in the high-speed memory 35. When the reading interval is several seconds, the rewriting interval is several hundred seconds. Accordingly, it is possible to improve reliability since a probability of the mirror configuration information in which a soft error occurs being corrected before being read is improved.

Second Embodiment

Figure 2:
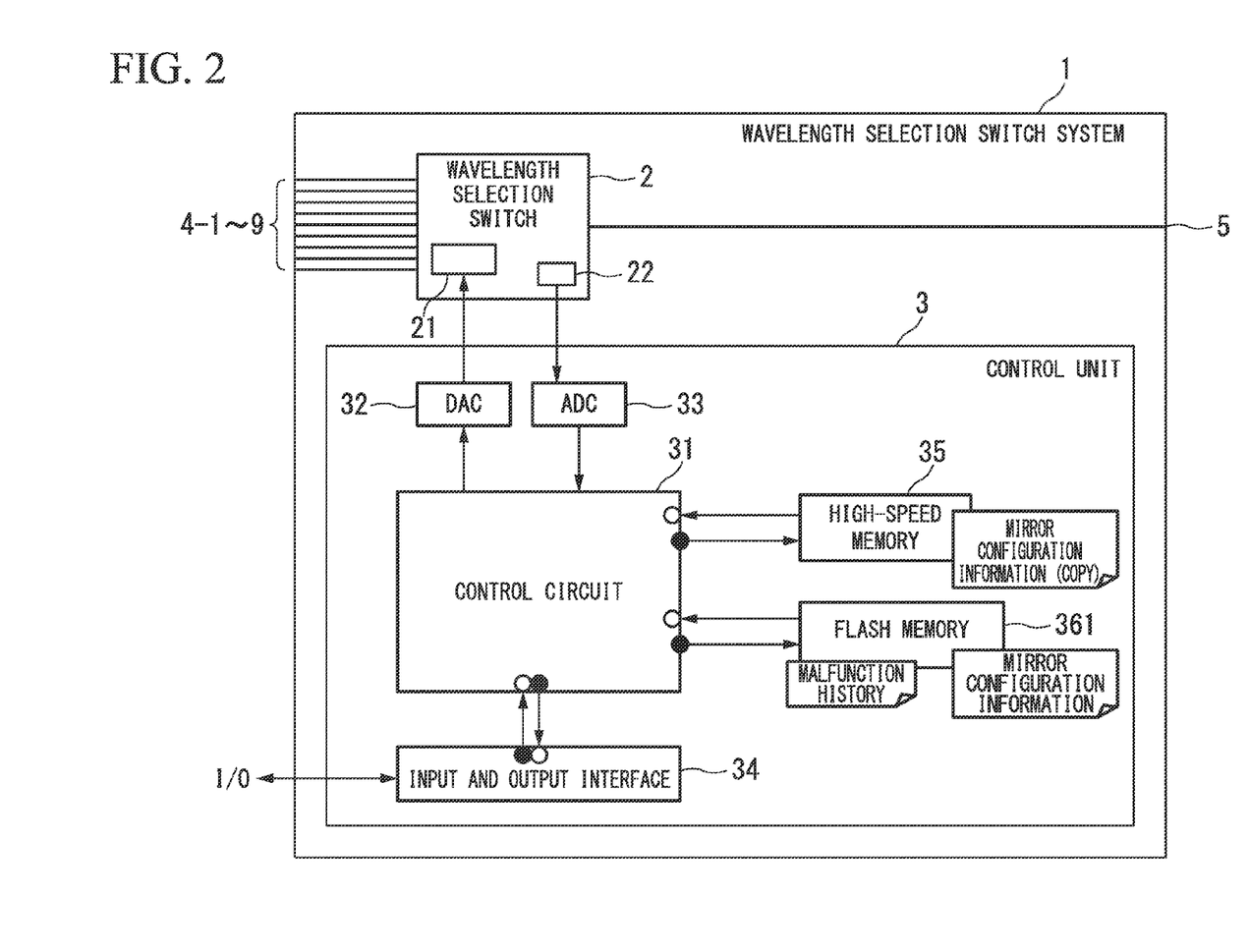
FIG. 2 is a block diagram illustrating a configuration of a second embodiment of the present invention.

Next, a wavelength selection switch system according to a second embodiment of the present invention will be described. FIG. 2 is a block diagram illustrating a configuration of the embodiment. In FIG. 2, the same portions as those in the system illustrated in FIG. 1 are denoted with the same reference signs and description thereof is omitted. The system illustrated in FIG. 2 differs from the system illustrated in FIG. 1 in that a control circuit 31 gives parity to a signal propagating through a signal line in a control unit 3 and checks when receiving the signal to detect a malfunction. In FIG. 2, • (black circle) indicates a parity-given point, and ○ (white circle) indicates a parity check point. Furthermore, when a malfunction is detected, malfunction history information is written to the flash memory 361 that is a nonvolatile memory. By writing the malfunction history information to the flash memory 361, causes can be investigated when power is supplied after the malfunction occurs (usually, in a communication system, power is turned off when a malfunction occurs in order to perform replacement with a spare article).

However, when the flash memory 361 is used as a nonvolatile memory, the number of times of writing is limited and thus an idea is necessary. For example, when a malfunction such as peeling occurs in the signal line in the control unit 3, a parity error is detected each time data passes through the malfunction detection point (parity check point). If a malfunction history is written to the flash memory 361 directly after the detection, a limit of writing of the flash memory is immediately reached. In order to prevent this, when the malfunction is detected, an address in the flash memory 361 to which the malfunction history is to be written is first read. If the history has already been written, writing may not be performed. However, in order to make such a determination, a circuit scale increases and operation speed is likely to be sacrificed. Therefore, a method of preventing the sacrifice in operation speed using characteristics of the flash memory is applied.

When data is written to the flash memory 361, erasure is performed in units of blocks of the flash memory 361, all bits in the block are changed to 1, and then the data is written. The erasure in units of blocks in this case is limited and the number of erasures is about 100,000.

The erasure of data is essential in writing "1" to the flash memory, but there is no limitation to change "1" to "0." When "1" is instructed to be written, the flash memory 361 is subjected to block erasure, but when "0" is instructed to be written, "1" is changed to "0" only in the malfunction detection point without performing the block erasure. Therefore, a block to which the malfunction history is to be written is erased in advance, and all bits are set to be "1." Then, when a malfunction occurs, a bit of a corresponding address of the flash memory 361 is set to be "0" to leave the malfunction history. Accordingly, a writing limitation of the flash memory 361 can be eliminated without determining whether writing is allowed.

Third Embodiment

Figure 3:
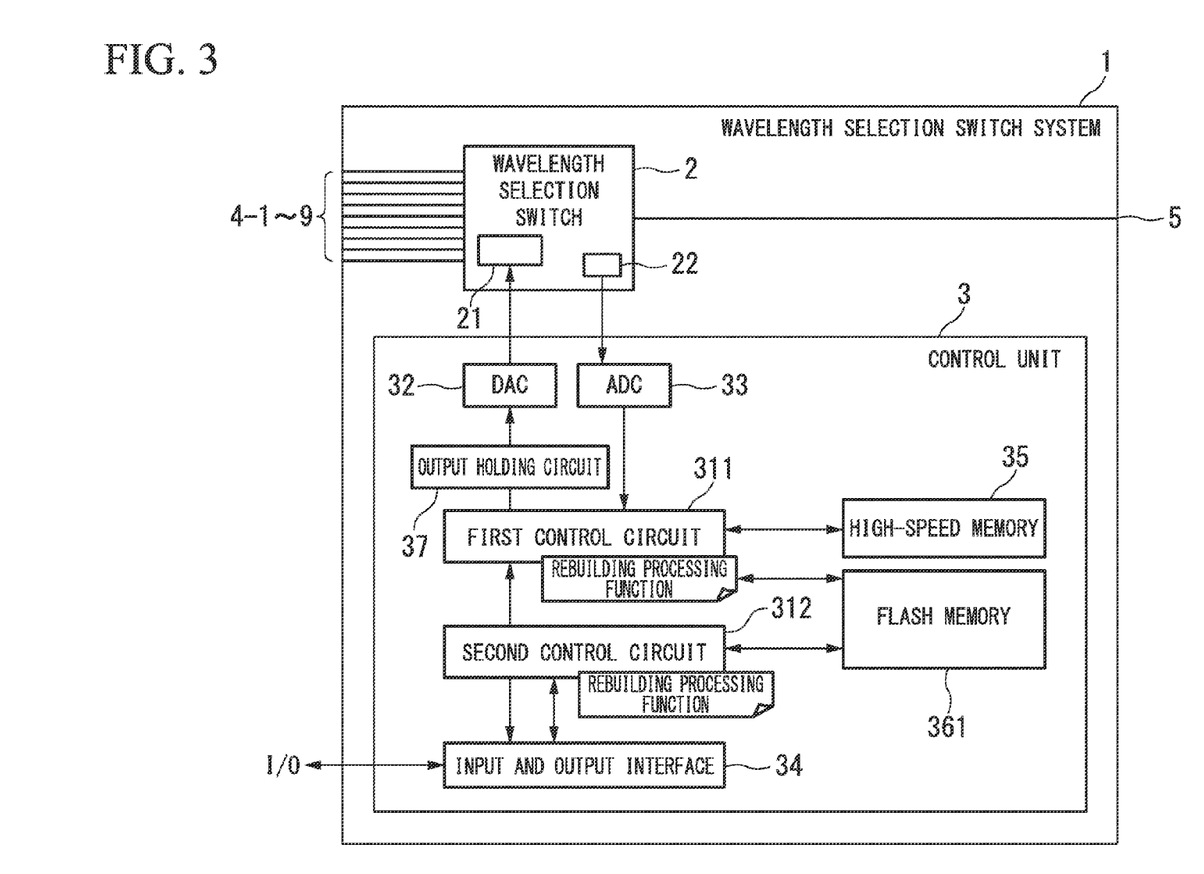
FIG. 3 is a block diagram illustrating a configuration of a third embodiment of the present invention.

Next, a wavelength selection switch system according to a third embodiment of the present invention will be described. FIG. 3 is a block diagram illustrating a configuration of the embodiment. In FIG. 3, the same portions as those in the system illustrated in FIG. 2 are denoted with the same reference signs and description thereof is omitted. The system illustrated in FIG. 3 differs from the system illustrated in FIG. 2 in that the control circuit 31 is replaced with a first control circuit 311 and a second control circuit 312, and an output holding circuit 37 is provided between the first control circuit 311 and a DAC 32. The output holding circuit 37 holds an immediately previous output state during rebuilding of the first control circuit 311.

When circuit correction for a malfunction of the first control circuit 311 or circuit correction for function improvement is desired to be performed, it is difficult to perform circuit correction without affecting the optical signal passing through the wavelength selection switch 2 in the conventional wavelength selection switch system 1 and the wavelength selection switch systems 1 illustrated in FIGS. 1 and 2. Therefore, two control circuits (the first control circuit 311 and the second control circuit 312) are included and have a function of rebuilding the other control circuit. Circuit information of both the first control circuit 311 and the second control circuit 312 is held in the flash memory 361.

For example, when the second control circuit 312 is repaired, the circuit information for the second control circuit 312 in the flash memory 361 is rewritten and then a rebuilding instruction is sent to the first control circuit 311. The first control circuit 311 resets the second control circuit 312 and writes the circuit information to perform rebuilding. Since the second control circuit 312 controls the minor 21 of the wavelength selection switch 2 through the DAC 32, an instruction is issued so that an output is held in the output holding circuit 37 connected to the DAC 32 before the second control circuit 312 is reset. In addition, according to a type of DAC 32, if the DAC has a specification that holds an immediately previous output voltage when there is no instruction, the output holding circuit 37 may be omitted. Further, the circuit information of the first control circuit 311 and the second control circuit 312 may not be held in the flash memory 361, and a dedicated nonvolatile memory may be provided inside or outside the control unit 3. In addition, the number of control circuits may not be 2 but may be 3 or more, and the control circuit may include one control circuit and a rewritable ROM (read-only memory). When a ROM is used, a function unlikely to be rewritten may be stored in the ROM.

Further, between the first control circuit 311 and the second control circuit 312, one may include one control circuit having all functions and the other may include one small control circuit for holding an output to reduce costs, instead of each of the first control circuit 311 and the second control circuit 312 including a control circuit having all the functions, as illustrated in FIG. 3. In this case, there is an effect that, even when a large control circuit having all the functions is hung up due to an error or the like, the wavelength selection switch 2 holds the output and does not affect a main signal even if the wavelength selection switch is not a self-holding type.

Further, a period of rewriting of the configuration information may be, for example, a period in which an FIT value is 100 or less based on a degree of soft error allowance, the period may be fixed, the period may be small in inverse proportion to an error occurrence probability, the period may be switched to a smaller period when the error occurrence probability exceeds a predetermined threshold, or rewriting may be performed at any time regardless of the rewriting period each time the error is detected.

Further, when the rewriting period for the configuration information is a period shorter than a mirror control period, an FIT number may be enhanced as follows.

Rewriting of the configuration information is performed in a period $T_2$ on a high-speed memory (SRAM) in which an average occurrence period of the soft error is $T_1$. In addition, $T_2$ is determined to be $1/n$ of an average minor control period. Since an error is included in data for mirror control in this condition when data is read immediately after the soft error occurs (before the configuration information is rewritten to correct the error), a probability that the soft error will occur within a certain period is $T_2/T_1$, and a probability that data will be referenced within the period is expressed using an equation below.

$$(T_2/T_1) \times (1/(T_2 \times n)) = 1/(T_1 \times n)$$

This is $1/n$ of $1/T_1$, which is an error occurrence probability when rewriting is not periodically performed. For example, if the configuration information is rewritten in a period of one second when the average minor control period is 1000 seconds, the FIT number is $1/1000$ of the FIT number when rewriting is not periodically performed. The rewriting period $T_2$ of the configuration information may be determined according to the FIT number per unit bit of the high-speed memory (SRAM), a memory scale, the average mirror control period, and a required FIT number.

Thus, the wavelength selection switch system according to the present invention includes, in the path of the optical signal from the input port to the output port, the control circuit for setting, for each wavelength, a loss when the optical signal passes through the wavelength selection switch, the nonvolatile memory, and the high-speed memory (volatile memory) in which reading and writing of data can be performed at a higher speed than in the nonvolatile memory. With the wavelength selection switch system according to the present invention, the configuration information of the wavelength selection switch is held in the nonvolatile memory, this configuration information is copied to the high-speed memory, and the configuration information is read at a high speed. Accordingly, the wavelength selection switch can operate at a high speed and the held data is prevented from being destroyed due to an influence of cosmic rays or the like on the high-speed memory (volatile memory). In other words, with the wavelength selection switch system according to the present invention, the configuration information held in the nonvolatile memory is periodically rewritten to the high-speed memory in order to prevent a defect of the wavelength selection switch. Accordingly, it is possible to improve reliability of reading of the configuration information in comparison with a conventional wavelength selection switch.

As described above, in the wavelength selection switch system for an ROADM (Reconfigurable Optical Add/Drop Multiplexer), the configuration information used for control is copied to the high-speed memory such as an SRAM rather than the nonvolatile memory such as a flash memory and used, and the soft error with use of the high-speed memory is solved by periodical rewriting from the nonvolatile memory to the high-speed memory and parity checking. Therefore, it is possible to suppress occurrence of a soft error and a signal error caused by external noise or the like to maintain reliability while achieving a high-speed reading operation of the configuration information for control.

Conventional solutions to the soft error of the configuration information include a method of correcting an error using an ECC (Error Check and Correct) memory, a method of performing majority decision from outputs of 3 redundant circuits, and the like. However, in the wavelength selection switch system described above, since a circuit and process are simple and the configuration information is periodically rewritten, an effect of a low error probability can be obtained.

Further, while the configuration in which both the nonvolatile memory and the volatile memory are included in order to operate the wavelength selection switch 2 at a high speed, the information stored in the memory can be read at a high speed, and the information stored in the memory can be prevented from being destroyed due to cosmic rays has been described above, this configuration is applicable to communication devices other than the wavelength selection switch, or devices other than the communication device. In other words, the configuration is applicable to a device necessarily requiring that the information stored in the memory can be read at a high speed and the information stored in the memory is prevented from being destroyed due to cosmic rays.

While the embodiments of the present invention have been described above with reference to the drawings, it is obvious that the present invention is not limited to the above embodiments. Accordingly, additions, omissions, substitutions, and other modifications of the components can be made without departing from the technical spirit and scope of the present invention.

INDUSTRIAL APPLICABILITY

The wavelength selection switch system according to the present invention is applicable to a device necessarily requiring that the information stored in the memory can be read at a high speed and the information stored in the memory is prevented from being destroyed due to cosmic rays or the like.

DESCRIPTION OF REFERENCE SYMBOLS 1 wavelength selection switch system
2 wavelength selection switch
3 control unit
4 input port
5 output port
31 control circuit
32 DAC
33 ADC
34 input and output interface
35 high-speed memory
36 nonvolatile memory
311 first control circuit
312 second control circuit
361 flash memory

The invention claimed is:

1. A wavelength selection switch system comprising:
a wavelength selection switch including an input port and an output port;
a nonvolatile memory in which configuration information for controlling an operation of the wavelength selection switch is stored;
a high-speed memory in which reading and writing can be performed at a higher speed than in the nonvolatile memory, and that stores a copy of the configuration information stored in the nonvolatile memory; and
a control unit that controls an operation of the wavelength selection switch based on the configuration information read from the high-speed memory,
wherein the control unit periodically reads the configuration information stored in the nonvolatile memory and writes a copy of the read configuration information to the high-speed memory.

2. The wavelength selection switch system according to claim 1, further comprising:
a normality confirmation unit that confirms normality of data transferred between the control unit and the nonvolatile memory and between the control unit and the high-speed memory;
a malfunction history writing unit that writes malfunction history information to the nonvolatile memory when the normality cannot to be confirmed by the normality confirmation unit; and
a malfunction notification unit which notifies the outside of information indicating occurrence of a malfunction when the normality cannot to be confirmed.

3. The wavelength selection switch system according to claim 2, wherein the nonvolatile memory is a flash memory, and writing of the malfunction history information is performed by setting a bit of a predetermined address in the flash memory corresponding to a malfunction detection point to be 1 in advance, and setting the bit of the predetermined address to be 0 when the malfunction occurs.

4. The wavelength selection switch system according to claim 1,
wherein the control unit includes a first control circuit and a second control circuit, and
when circuit information of the first control circuit is rebuilt, the second control circuit controls the operation of the wavelength selection switch and rebuilds the circuit information of the first control circuit to be rebuilt.

5. A method for controlling a wavelength selection switch system comprising:
a wavelength selection switch including an input port and an output port;
a nonvolatile memory in which configuration information for controlling an operation of the wavelength selection switch is stored;
a high-speed memory in which reading and writing can be performed at a higher speed than in the nonvolatile memory, and that stores a copy of the configuration information stored in the nonvolatile memory; and
a control unit that controls an operation of the wavelength selection switch based on the configuration information read from the high-speed memory,
wherein the method includes a step in which the control unit periodically reads the configuration information stored in the nonvolatile memory and writes a copy of the read configuration information to the high-speed memory.

6. The method for controlling a wavelength selection switch system according to claim 5, further comprising:
a normality confirmation step for confirming normality of data transferred between the control unit and the nonvolatile memory and between the control unit and the high-speed memory;
a malfunction history writing step for writing malfunction history information to the nonvolatile memory when the normality cannot be confirmed in the normality confirmation step; and
a malfunction notification step for notifying the outside of information indicating occurrence of a malfunction when the normality cannot to be confirmed.

7. The method for controlling a wavelength selection switch system according to claim 6, wherein the nonvolatile memory is a flash memory, and writing of the malfunction history information is performed by setting a bit of a predetermined address in the flash memory corresponding to a malfunction detection point to be 1 in advance, and setting the bit of the predetermined address to be 0 when the malfunction occurs.

8. The method for controlling a wavelength selection switch system according to claim 5,
wherein the control unit includes a first control circuit and a second control circuit, and
the method includes a step in which, when circuit information of the first control circuit is rebuilt, the second control circuit controls the operation of the wavelength selection switch and rebuilds the circuit information of the first control circuit to be rebuilt.

* * * * *